Sept. 3, 1963          K. ZEISS          3,102,665
DEVICES FOR TRANSFERRING PARTICULATE SOLIDS
Filed Sept. 16, 1960          3 Sheets-Sheet 1

INVENTOR.
KARL ZEISS
BY
Kenneth W. Brown, Atty

Sept. 3, 1963 K. ZEISS 3,102,665
DEVICES FOR TRANSFERRING PARTICULATE SOLIDS
Filed Sept. 16, 1960 3 Sheets-Sheet 2

INVENTOR.
KARL ZEISS

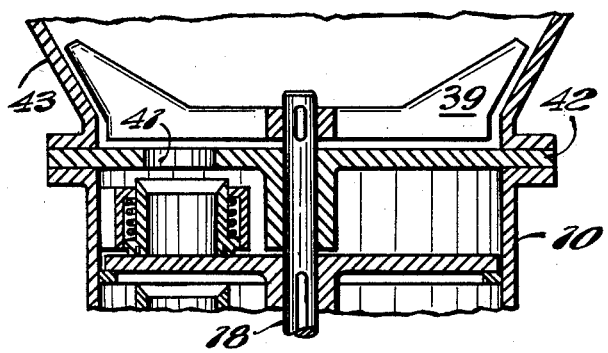
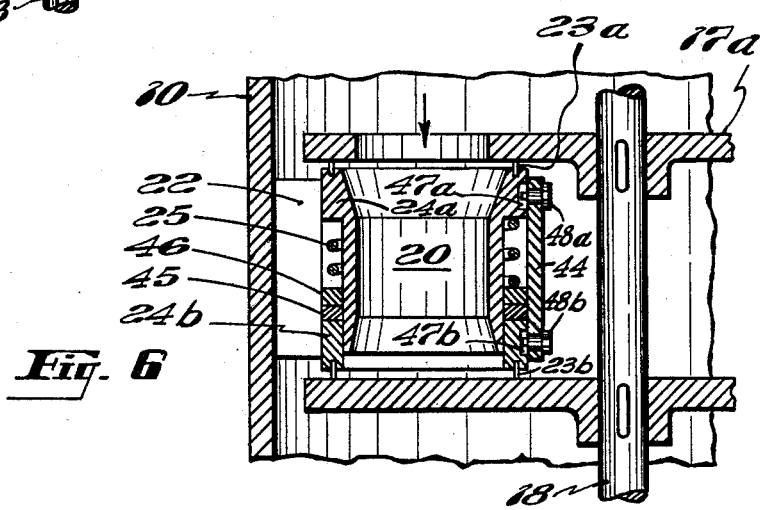
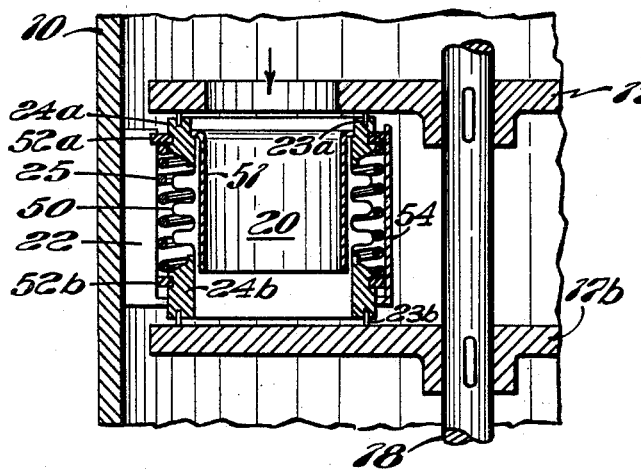

United States Patent Office 3,102,665
Patented Sept. 3, 1963

3,102,665
DEVICES FOR TRANSFERRING PARTICULATE SOLIDS
Karl Zeiss, Kronberg, Taunus, Germany, assignor to Deutsche Gold- und Silber-Scheideanstalt vormals Roessler, Frankfurt am Main, Germany, a corporation of Germany
Filed Sept. 16, 1960, Ser. No. 56,591
11 Claims. (Cl. 222—239)

This invention relates to devices adapted for use in transferring materials, especially particulate solids, in a continuous, controlled manner by means of gravity. The devices in question are particularly useful for controlling the introduction or removal of solids to or from a zone of higher or lower pressure.

Most of the simple discharge devices (such as rotary star valves) which are adapted for continuous operation, do not maintain a gas tight seal across zones of differing pressures. Therefore, in the past, in most cases where a gas tight pressure seal had to be maintained between two solids transfer zones, a discontinuous method of operation has been resorted to involving the use of multiple valves and intermediate compression or decompression chambers. Furthermore, one must periodically operate the valves for filling and emptying the several chambers. This operating requires numerous workers or an expensive automatic apparatus. The pressure shocks occurring with the changing over are not desired in many cases either.

It is accordingly an object of this invention to provide an improved device for transferring particulate solids by means of gravity continuously in controlled manner with a minimum of concomitant gas flow associated therewith, even when a differential pressure exists across the solids transfer zones.

It is also an object to provide such apparatus which is simpler and more compact than previous apparatuses capable of performing similar operations.

A further object is to provide such apparatus which is more versatile than previous apparatuses designed for similar operations in that it can readily be modified slightly so as to permit the simultaneous accomplishment of additional operations such as blending, mixing or homogenizing, etc. free-flowing solids while being transferred in said apparatus.

Still other objectives and advantages of this invention will become more apparent from a study of the detailed description and explanation of same which follows.

In accordance with the present invention, a device is provided for the continuous charging or removal of solid substances that are under excess pressure or vacuum, which is free of the disadvantages characteristic of the prior art devices. The device in accordance with the present invention solves this problem of conveying of solids between zones of different pressure by providing a plurality of chambers arranged in vertical sequence in a common housing with a circular cross section, which chambers are selectively opened and closed alternately at the bottom by means of sliding plates provided with suitable apertures therethrough. The circular sliding plates are mounted onto a common, vertically arranged shaft, with which they rotate slowly and evenly inside said housing.

The device in accordance with the invention for the continuous feeding and/or removal of solid substances in which the conveying takes place by their own weight due to gravity, is characterized by a housing with a circular cross section, at least two inner chambers open at the top and bottom, arranged spaced under one another in the housing, a vertical shaft arranged concentrically in the housing and connected rigidly to the circular sliding plates, each of which has one or more openings therein, said plates being located relative to one another so that the openings in adjacent plates are offset horizontally from one another with the result that, as the plates rotate, at least one of any two adjacent chambers lying immediately above or below one another, is always sealed at the bottom.

As will be explained in more detail hereinafter, the side walls of the inner chambers, which are preferably of circular cross section, can themselves be both flexible or extensible and spring-loaded so that they always press evenly against the sliding closure plate below same, or even the closure plates both above and below. The resultant seal, due to this resilient pressing, since it is self-adjusting, is not subject to failure due to expansions and contractions caused by heat. Wear-resistant, resilient, sealing rings can be applied to the lower edges of said side walls, if desired.

Alternatively, there is also the possibility of pressing the entire shaft with the attached sliding closure plates, from below, upwards against the lower edges of the side walls of said inner chambers. In this case the pressing springs in the chamber walls can be omitted; but in this case pressure springs are preferably provided between the individual pusher plates. In this case the pusher plates must be mounted on the shaft in such a way as to be displaceable to some extent in the axial direction.

The sliding closure plates can also be sealed on the periphery of the housing. Compartments that are gas tight also at the top are formed thereby. The total difference in pressure across which the solids are being transferred is thereby sub-divided in accordance with the number of such compartments, whereby the shocks otherwise usual are reduced to a great extent with the pressure equalization between the inlet and the outlet. By means of side openings, pipes, or other connections arranged in the outer housing at appropriate points, a still more gradual equalization of the pressure can, of course, be created between the individual chambers, or supplementary protective gas can be supplied from outside the housing, which can also be used for cooling or heating. etc. The same side connections or pipes can also serve for measuring the pressure or temperature.

An additional modification of the invention, is also provided in which it is possible within the same housing to transfer or convey, via one or more parallel paths, two or more streams of the same or different substances. This has the possible added advantages of (1) serving to increase capacity and/or (2) providing mixing of different substances or homogenization of a single material of variable quality. The degree of mixing achieved can be adjusted by regulating the number and sizes of the plate openings and thereby varying the proportions of time during which various inner compartments are in the open versus the closed position relative to the next lower compartment.

When required, an arrangement for mixing the products can also be provided either at the inlet or the outlet, or at some point in between within the housing. It is also possible to fix stirring paddles above the top inlet, which paddles are driven by the same vertical shaft which runs through the entire apparatus and carries the sliding closure plates. A more even product supply is thereby assured. The charging device in accordance with the invention can be made of various materials. Above all, wear-resistant materials can be used, that can be worked by casting, or by shaping and grinding, for example, chilled cast iron, stonewares, or hard porcelain.

The device in accordance with the invention, in comparison with the previously known devices intended for equivalent purposes, has the following combination of advantages: Low construction height, simple drive by the common shaft, and smooth pressure equalization between the inlet and the outlet. Moreover, the use of most known charging devices is limited solely to the conveying of dry, free-flowing solid substances, whereas with the new charging device of this invention, it is also possible to convey wet solids, slimes or slurries.

The drawings appended show preferred embodiments of the invention and are intended to serve for a better understanding of the basic conception of the invention as well as practical adaptations thereof.

In the drawings, FIGURE 1 is a side view largely in cross-section of a complete unit having a single inlet and outlet and two inner chambers each having a sliding closure plate sealably engaging the lower edges of the side walls of said inner chambers. FIGURE 2 is a similar view of a portion only of another unit in which the sliding closure plates are spring-loaded and axially movable rather than the side walls of the inner chambers.

FIGURE 5 is a side view, largely in cross-section, of the top portion of a unit similar in design to that of FIGURE 1, but in which the feed hopper above the top inlet is larger, permitting the introduction of a stirring paddle mounted on the same shaft which carries the sliding closure plates.

FIGURES 6 and 7 both illustrate somewhat related methods of constructing the side walls of the inner chambers so that said side walls are comprised of oppositely spring-loaded elements which push and seal against the respective sliding closure plates immediately above as well as below each chamber.

Figure 1:
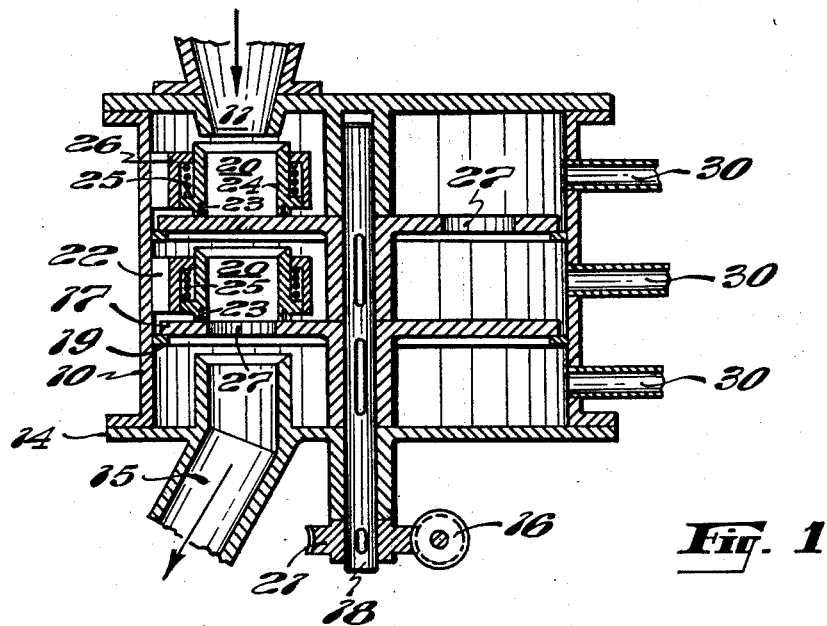

Looking in detail first at FIGURE 1, it will be seen that the apparatus consists of a main cylindrical shell or housing 10 having a top cover plate with a suitable inlet opening 11 communicating directly with the feed hopper located on top. Likewise the shell 10 is closed at the bottom by bottom plate 14 which is equipped with discharge outlet 15. The interior of the housing 10 is divided into a series of vertical compartments or levels by means of circular closure plates 17 which are mounted on the common shaft 18 concentrically located within said cylindrical housing 10. Engagement of the drive means 16 with the gear 21 mounted on said shaft 18 causes said shaft together with the circular closure plates 17 thereon to rotate about the vertical axis of housing 10. Seal rings 19 are mounted around the inside of said housing 10 so that the underside of said closure plates 17 seal against same near their outer peripheries.

Within the interior of the housing 10, inner sluicing chambers 20 are provided, arranged one under another between the upper inlet and lower outlet of the apparatus. Each inner sluicing chamber 20 is composed of a stationary outer frame 26 which is rigidly mounted on the inside of housing 10 by means of struts 22. The solids confining side walls of each inner sluicing chamber are actually formed by cylindrical sleeves 24 which fit inside the stationary frames 26 in such a way that they are urged downwardly by helically coiled springs 25. The lower edges of sluicing chamber side wall sleeves 24 carry resilient seals 23 which press against the upper surface of circular closure plates 17 to form a gas tight seal.

Each closure plate 17 contains one or more openings 27. The size, shape and location of these openings 27 is such that during rotation of the plate 17, each opening 27 is at some point brought into position directly under and substantially coinciding with the opening through the inner side wall sleeve 24 of the sluicing chamber 20 immediately above. Furthermore, these openings 27 in the several closure plates 17 are so arranged that during rotation of the shaft 18 and assembled plates 17, each sluicing chamber 20 remains completely sealed by solid areas of the closure plate 17 therebelow whenever any immediately adjacent sluicing chamber 20 is not completely closed by solid areas of its corresponding closure plate 17. In other words, during operation of the apparatus, any given sluicing chamber 20 remains fully sealed until the ones immediately above and/or below it become fully sealed.

Side connections 30 as shown are optionally provided for possible use in inserting measuring instruments or for introducing additional materials such as auxiliary or protective gases from outside the apparatus. These connections 30 can also be used with suitable intermediate valves and conduits (not shown) for cyclical internal pressure equalization, which can, by known means (not shown), be synchronized with the opening and closing of the varying sluicing chambers 20.

Figure 2:
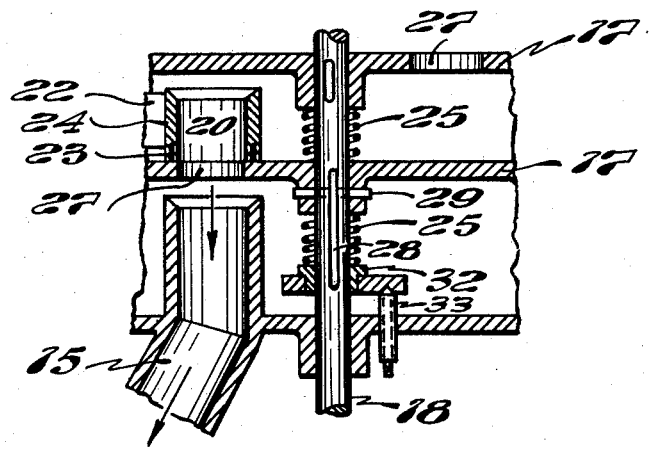

In the operation of FIGURE 2, the sluicing chambers 20 are formed of a simple sleeve 24 equipped on its lower edge with a resilient seal ring 23. However, in this case, sleeve 24 is stationary being rigidly attached by struts 22 to the main housing shell (not shown in FIGURE 2). In this case the sealing of the closure plate 17 against the lower edge of the sluicing chamber sleeve 24 is maintained by mounting the closure plates 17 on shaft 18 in such a way that they are free to move up or down on the shaft to a limited extent and by providing spring-loading of said closure plates 17 in an upward direction. In FIGURE 2, this is accomplished by elongating somewhat the slots 28 by means of which the closure plates 17 with the help of pins 29 engage the shaft 18 and by providing helically coiled springs 25 backed up at the bottom by support plate 32, the exact vertical location of which can be adjusted by mounting screws 33.

Figure 3:
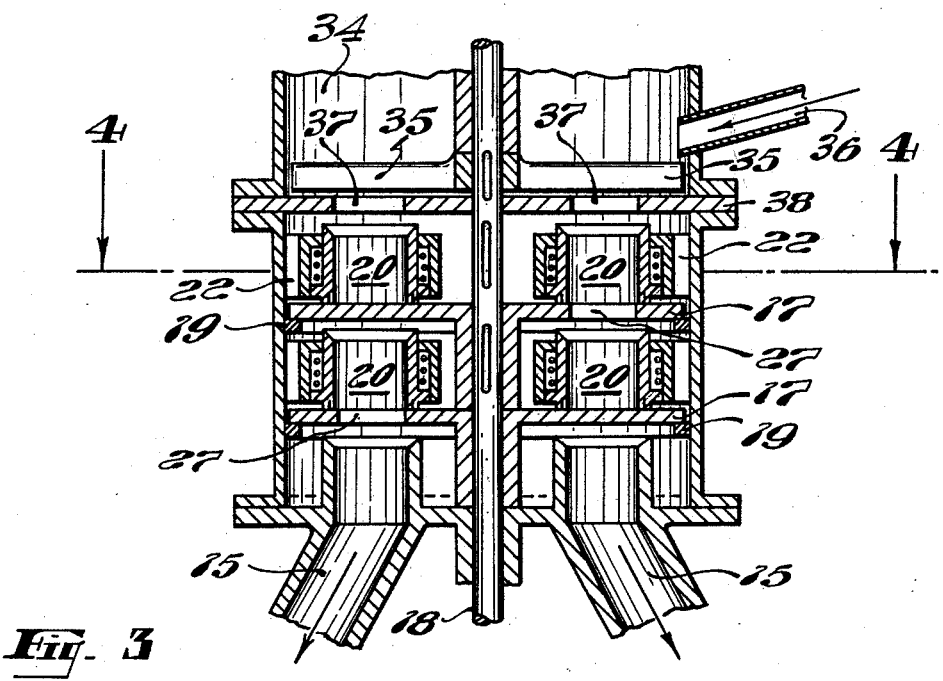
FIGURE 3 is a similar view of a portion only of a unit in which the sealing means is like that shown in FIGURE 1, but inlets and inner sluicing chambers are provided to allow the material handled to flow through the equipment in two parallel streams.

FIGURE 3 shows another modification in which two parallel series of inner sluicing chambers are provided in order to increase capacity and versatility of the unit. In this modification one or more solid streams are introduced into a top blending stage 34, either through side chutes such as 36 or other suitable feed hoppers (not shown) located on top, for example. This preliminary blending stage 34 is provided with mixing blades 35 which are mounted on the same common shaft 18 which carries the closure plates 17. The preliminary blending stage 34 at the top is separated from the lower part of the column by a divider plate 38 having two suitable feeder holes 37 of similar shape each leading downward toward one of the two parallel series of sluicing chambers below. Each series of sluicing chambers 20 is arranged vertically one above the other as in the apparatuses previously described. The vertical axes of the two parallel series are equidistant from the center of the shaft 18 so that the openings in the rotating closure plates 17 will come into alignment with the sluicing chambers on each side of the shaft during each rotation thereof. In the embodiment pictured each plate 17 is provided with two openings 27, which are about 90° apart so that the parallel sluicing chambers above each plate are opened and closed individually rather than simultaneously. The rest of the apparatus shown in FIGURE 3 is similar to that of FIGURE 1 except that two discharge outlets 15 are provided to capitalize fully on the increased capacity potentially provided.

Figure 4:
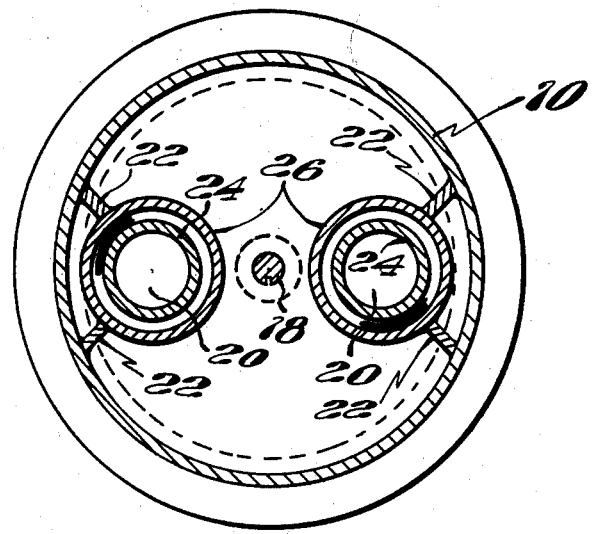
FIGURE 4 is a cross-sectional plan view taken along line 4—4 of FIGURE 3.

FIGURE 4 is a cross-sectional plan view along line 4—4 of FIGURE 3 and shows the symmetrical location of sluicing chambers 20 on either side of shaft 18 at a given level in the housing shell 10 as well as of the component parts of same, namely stationary frames 26 (which are attached to housing shell 10 by means of struts 22) and movable side wall sleeves 24.

FIGURE 5 shows how an added stirring device 39 can be placed on top of a column having, in this case, only a single series of sluicing chambers therein, as in FIGURE 1. In this case a large feed hopper 43 is provided across the top of the unit and the blades of the stirring device are suitably shaped to fit inside said hopper. The partially blended material then feeds down through opening 41 in cover plate 42. The rest of the unit is, of course, like that of FIGURE 1.

FIGURES 6 and 7 are enlarged views of sluicing chambers constructed so that the upper edge of the side walls thereof are spring-loaded upwardly while maintaining a downward spring-loading on the lower edge of said side walls. The use of sluicing chambers of such design obviates the need for the resilient sealing rings 19 which are shown mounted on the inside of the housing shell 10 in the units shown in FIGURES 1, 3 and 5.

In FIGURE 6 the double spring action is achieved in the side wall sleeves of said sluicing chamber by constructing each of said sleeves from two pieces 24a and 24b which telescope together and tend to be pushed apart by means of spirally coiled spring 25. The lower part of the spring 25 rests on a spacer ring 46 which in turn acts on the lower sleeve member 24b through a resilient sealing ring 45. This entire assembly is held inside a stationary mounting 44 which is rigidly attached to the main housing shell 10 through strut members 22. The movement of the two sleeve members 24a and 24b is restricted by feeler screws 48a and 48b projecting through stationary mounting 44 so that their tips engage grooves 47a and 47b in the respective sleeve members. The movement permitted in sleeve members 24a and 24b is, of course, sufficient to allow the resilient rings or facings 23a and 23b on the respective sleeve members to press against the respective closure plates 17a (above) and 17b (below) and form gas tight seals therewith.

In FIGURE 7, the side wall forming sleeve of the sluicing chamber 20 is similar to that of FIGURE 6 except in this case the end portions 24a and 24b thereof are held together by an intermediate spring bellows element 50. While the spring bellows alone can be relied upon to urge the two end portions 24a and 24b apart, optionally a spirally coiled spring 25 can again be inserted therebetween as well. In this case the action of said spring 25 can be transmitted by means of pressure rings 52a and 52b which engage the respective sleeve end portions 24a and 24b. A thin protective sleeve 51 is also provided inside the spring bellows 50 to prevent solids from being trapped within the convolutions of said bellows. Again the entire assembly is retained inside a stationary frame 54 which is rigidly attached to the main housing shell 10 by means of struts 22. The action of the spring bellows 50 and spring 25 again urges the end portions of the sleeve 24a and 24b apart and causes the resilient rings or facings 23a and 23b thereon to press and seal against the respective closure plates 17a above and 17b below.

It will be seen that the free gas chambers present around the sluicing chambers in other embodiments are no longer connected to the solids conveying path in the embodiments of FIGURES 6 and 7. Accordingly only a very slight movement of gas is needed for pressure equalization in these forms of the apparatus.

Windows or openings (not shown) can, of course, again be applied to the housing for observation, cleaning, temperature measurement or the like. However, in this case, it is not necessary to provide such openings with covers, valves, etc., since the main housing is not directly open to the sluicing chambers and the main conveying path of the solids.

Refinements may be added or alternative parts substituted in the above described apparatuses without departing from the spirit of this invention. Accordingly, it is to be understood that the specific embodiments already described have been given for purposes of illustration and that the scope of this invention is to be limited only by the claims appended hereafter.

I claim:

1. Apparatus for transferring particulate solid substances between zones of substantially different pressure under the influence of gravity consisting essentially of a main cylindrical gas-tight housing, a rotatable vertical shaft mounted concentrically along the vertical axis of said housing, means to rotate said shaft, a series of imperforate side wall inner chambers open at the top and bottom and arranged one above another inside said housing, a series of circular plates mounted on said shaft at locations spaced apart vertically from one another so that each plate is located immediately under a respective one of said inner chambers, said plates being apertured according to a pattern which will enable the apertures therein to be aligned with the open bottom of a respective inner chamber located immediately above the plate in question at some position during the rotation of said plates by said shaft, adjacent plates being oriented on said shaft in an arrangement relative to one another so that, when a given inner chamber is aligned at the bottom with such apertures, neither the next lower nor the next higher chamber is so aligned at the bottom, means for feeding solids to the top of said housing and means to withdraw solids from the bottom of said housing.

2. Apparatus as described in claim 1 in which spring means are provided to maintain the lower edge of the imperforate side walls of each inner chamber in constant contact with the upper face of the circular plate immediately below each chamber.

3. Apparatus as in claim 2 in which the lower edge of the said side walls of each inner chamber is faced with a resilient sealing material.

4. Apparatus as described in claim 1 in which two parallel and vertical series of said inner chambers are provided within the main housing.

5. Apparatus as described in claim 4 in which side connecting means for gas transfer and pressure equalization are provided on the main housing at positions above and below a respective plate.

6. Apparatus as described in claim 4 in which stirring means are provided in the upper feed zone of said housing for preliminary blending of the solids being transferred therethrough.

7. Apparatus for continuously transferring particulate solid substances between zones of substantially different pressure under the influence of gravity consisting essentially of a main cylindrical gas-tight housing, a rotatable vertical shaft mounted concentrically along the vertical axis of said housing, means to rotate said shaft continuously at a steady rate, a series of imperforate side wall chambers open at top and bottom and arranged one under another down through the interior of said housing, a series of circular plates mounted on said shaft at locations spaced apart vertically from one another so that each plate is located at a level corresponding to the junction between vertically adjacent chambers in said series of imperforate side wall chambers, said plates being apertured according to a pattern which will enable the apertures therein to coincide with and align themselves with the open ends of adjacent chambers in said series of imperforate side wall chambers at some position during the rotation of said plates which will be caused by rotation of said shaft, adjacent plates being oriented on said shaft in an arrangement relative to one another so that, when a given chamber is aligned at the bottom with said apertures, neither the next lower nor the next higher chamber is so aligned at the bottom, means for feeding solids to the top of said housing and means for withdrawing solids from the bottom of said housing.

8. The apparatus described in claim 7 in which the imperforate side walls of each of said chambers consist of upper and lower end portions movable relative to each other and spring loaded so as to urge them apart from one another and maintain said end portions in constant contact with the circular plates above and below.

9. Apparatus as described in claim 8 in which the upper edge of said movable upper end portion and the lower edge of said movable lower end portion are both faced with a resilient sealing material.

10. Apparatus as described in claim 8 in which the said upper and lower end portions telescope together with a spiral coil spring in between.

11. Apparatus as described in claim 8 in which the upper and lower end portions are connected by a continuous spring belows element.

References Cited in the file of this patent

UNITED STATES PATENTS

| | | |
|---|---|---|
| 1,276,867 | Bradley | Aug. 27, 1918 |
| 1,291,804 | Eckstein | Jan. 21, 1919 |
| 1,350,739 | Rose | Aug. 24, 1920 |
| 1,617,922 | Morrison | Feb. 15, 1927 |
| 1,644,589 | Heron | Oct. 4, 1927 |
| 2,246,654 | Arveson | June 24, 1941 |

FOREIGN PATENTS

| | | |
|---|---|---|
| 734,048 | France | Oct. 14, 1932 |